United States Patent
Somemiya

(10) Patent No.: US 9,442,455 B2
(45) Date of Patent: Sep. 13, 2016

(54) IMAGE FORMING APPARATUS INCLUDING A TURNABLE OPERATION UNIT

(71) Applicant: FUJI XEROX CO., LTD., Minato-ku, Tokyo (JP)

(72) Inventor: Tsutomu Somemiya, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 195 days.

(21) Appl. No.: 14/060,207

(22) Filed: Oct. 22, 2013

(65) Prior Publication Data

US 2014/0352112 A1 Dec. 4, 2014

(30) Foreign Application Priority Data

May 29, 2013 (JP) .................................. 2013-112522

(51) Int. Cl.
*G03G 21/16* (2006.01)
*H04N 1/00* (2006.01)

(52) U.S. Cl.
CPC ...... *G03G 21/1623* (2013.01); *H04N 1/00493* (2013.01); *H04N 1/00496* (2013.01); *H04N 1/00564* (2013.01); *Y10T 16/5404* (2015.01)

(58) Field of Classification Search
CPC ..................... G03G 21/1623; G03G 21/1633; G03G 15/502; G03G 15/5016; G03G 2221/16; H04N 1/00496; H04N 1/00493; H04N 1/00564; H04N 1/00543
USPC ........................................................ 399/110
See application file for complete search history.

(56) References Cited

U.S. PATENT DOCUMENTS

2010/0315658 A1* 12/2010 Niikawa ............ G03G 21/1628
 358/1.5
2011/0149354 A1* 6/2011 Takamura et al. ............ 358/474

FOREIGN PATENT DOCUMENTS

| JP | 11-237810 A | 8/1999 |
|---|---|---|
| JP | 2003005611 A | 1/2003 |
| JP | 2006-347090 A | 12/2006 |
| JP | 2011101963 A | 5/2011 |
| JP | 2012-233940 A | 11/2012 |

OTHER PUBLICATIONS

Communication dated Jun. 28, 2016, issued by the Japan Patent Office in corresponding Japanese Application No. 2013-112522.

* cited by examiner

*Primary Examiner* — David Gray
*Assistant Examiner* — Andrew V Do
(74) *Attorney, Agent, or Firm* — Sughrue Mion, PLLC

(57) ABSTRACT

An image forming apparatus includes a support column having one end fixed to an apparatus body and the other end that turnably supports an operation unit, an opening and closing member that moves between a closed position to hide an inside of the apparatus body and an open position to expose the inside, and a lock unit that holds the operation unit at a first holding position to hold the operation unit within a moving area of the opening and closing member and a second holding position to hold the operation unit outside the moving area of the opening and closing member. The lock unit releases the operation unit in cooperation with opening of the opening and closing member in a state in which the operation unit is held at the first holding position, and moves the operation unit to the second holding position while keeping the operation unit released.

10 Claims, 8 Drawing Sheets

IMAGE FORMING APPARATUS INCLUDING A TURNABLE OPERATION UNIT

CROSS-REFERENCE TO RELATED APPLICATIONS

This application is based on and claims priority under 35 USC 119 from Japanese Patent Application No. 2013-112522 filed May 29, 2013.

BACKGROUND

Technical Field

The present invention relates to an image forming apparatus.

SUMMARY

According to an aspect of the invention, there is provided an image forming apparatus including a support column having one end fixed to an apparatus body and the other end that turnably supports an operation unit, an opening and closing member that moves between a closed position to hide an inside of the apparatus body and an open position to expose the inside, and a lock unit that holds the operation unit at a first holding position to hold the operation unit within a moving area of the opening and closing member and a second holding position to hold the operation unit outside the moving area of the opening and closing member. The lock unit releases the operation unit in cooperation with an opening operation of the opening and closing member in a state in which the operation unit is held at the first holding position, and moves the operation unit to the second holding position while keeping the operation unit released.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the drawings. The present invention is not limited to the exemplary embodiment.

In the following description with reference to the drawings, it should be noted that the drawings are schematic and the proportion in dimensions of each member is different from actual one. Illustration of members other than necessary members for explanation will be properly omitted for easy understanding.

1. Configuration of Image Forming Apparatus

Figure 1:
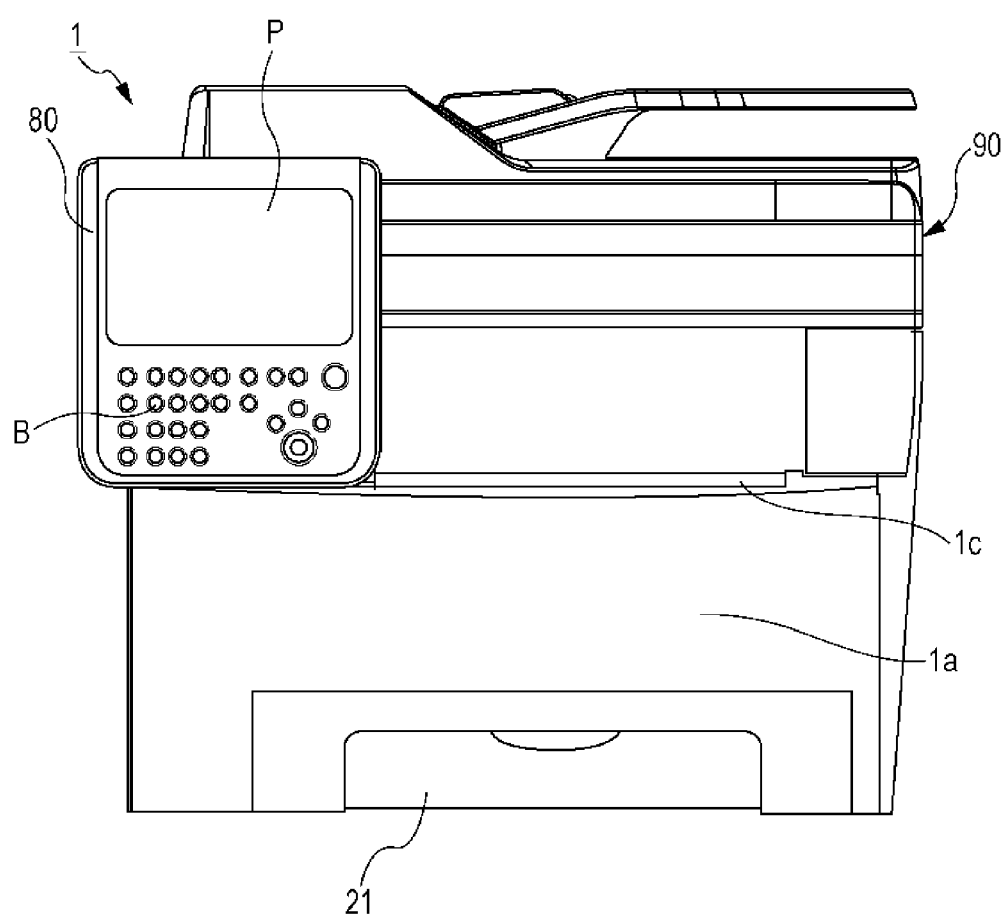
FIG. 1 is an external front view of an image forming apparatus.
Figure 2:
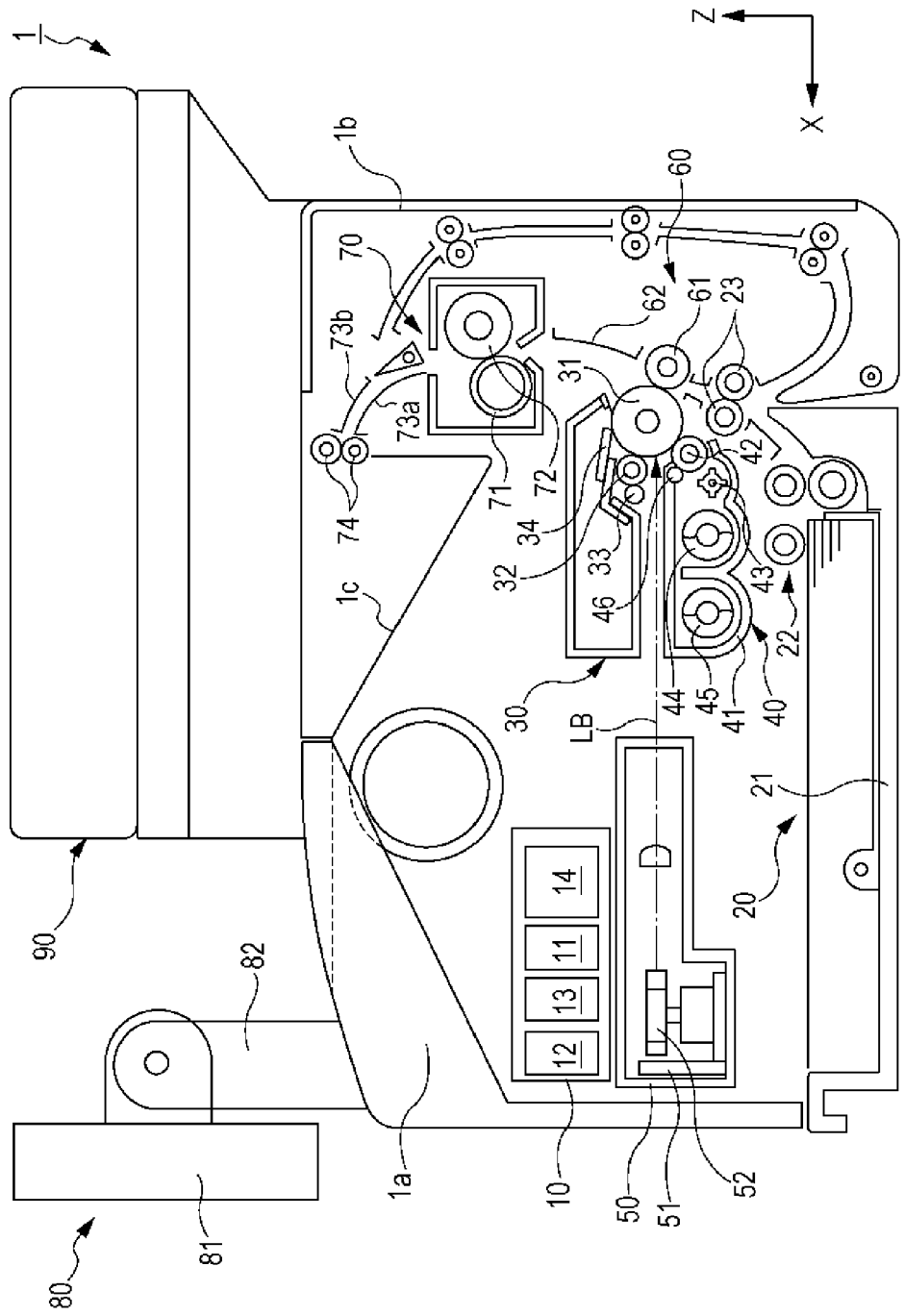
FIG. 2 is a schematic cross-sectional view illustrating an internal configuration of the image forming apparatus.

FIG. 1 is an external front view of an image forming apparatus 1 according to an exemplary embodiment, and FIG. 2 is a schematic cross-sectional view illustrating an internal configuration of the image forming apparatus 1.

The overall configuration and operation of the image forming apparatus 1 will be described below with reference to the drawings.

1.1 System Configuration of Image Forming Apparatus

The image forming apparatus 1 includes a control device 10, a paper feeding device 20, a photoconductor unit 30, a developing device 40, an exposure device 50, a transfer device 60, a fixing device 70, an operation unit 80, and an image reader 90.

On a front side of the image forming apparatus 1, a front covering 1a is turnably supported to open the inside of the image forming apparatus 1 frontward (in an X-direction), for example, when consumables are replaced.

On a rear side of the image forming apparatus 1, a rear covering 1b is turnably supported to open the inside of the image forming apparatus 1 in case of a paper jam or inside inspection.

On an upper side (Z-direction) of the image forming apparatus 1, an output tray 1c is provided to receive output sheets on which images are recorded.

The control device 10 includes an image-forming-apparatus control unit 11 that controls the operation of the image forming apparatus 1, a controller 12 that prepares image data according to a print request, an exposure control unit 13 that controls the lighting of a light source in the exposure device 50, and a power supply device 14. The power supply device 14 applies voltage to a charging roller 32, a developing roller 42, a transfer roller 61, etc. described below, and supplies electric power to the exposure device 50.

The controller 12 converts image data input from the image reader 90 and print information input from an external information transmission device (for example, a personal computer) into image information for forming a latent image, and outputs driving signals to the exposure control unit 13 at a preset timing.

The operation unit 80 is used to input various settings and instructions and to display information. That is, the operation unit 80 corresponds to a so-called user interface. More specifically, the operation unit 80 is formed by a combination of a liquid crystal display panel, various control buttons, a touch panel, etc.

1.2 Configuration and Operation of Image Forming Section

The paper feeding device 20 is provided at the bottom of the image forming apparatus 1. The paper feeding device 20 includes a paper cassette 21 that stores sheets serving as recording media. A lot of sheets are stacked on an upper surface of the paper cassette 21. The sheets stacked on the paper cassette 21 are positioned in a width direction by a regulation plate (not illustrated), are drawn out one by one from an upper side by a sheet drawing member 22, and are then transported to a nip between a pair of registration rollers 23.

The photoconductor unit 30 is provided above the paper feeding device 20, and includes a photoconductor drum 31 that is rotationally driven. A charging roller 32, a developing device 40, a transfer roller 61, and a cleaning blade 34 are arranged in a rotating direction of the photoconductor drum 31. A cleaning roller 33 for cleaning a surface of the charging roller 32 is provided in opposed contact with the charging roller 32.

The developing device 40 includes a developing housing 41 that stores developer. In the developing housing 41, a developing roller 42 opposed to the photoconductor drum 31, and a paddle wheel 43 provided on an obliquely lower back side of the developing roller 42 to agitate and transport the developer toward the developing roller 42. Further, a pair of augers 44 and 45 for agitation and transport are provided on a back side of the paddle wheel 43. A layer regulation roller 46 for regulating the layer thickness of developer is provided close to the developing roller 42.

The exposure device 50 includes a laser beam emitting unit 51 used as a light source, and a rotating polygonal mirror 52 that deflects and reflects a laser beam LB from the laser beam emitting unit 51. The exposure device 50 scans the surface of the photoconductor drum 31 with the laser beam LB modulated according to data on an image to be formed.

The surface of the rotating photoconductor drum 31 is charged by the charging roller 32, and an electric latent image is formed thereon by the laser beam LB emitted from the exposure device 50. The electrostatic latent image formed on the photoconductor drum 31 is developed as a toner image by the developing roller 42.

The transfer device 60 includes a transfer roller 61 that forms a nip with the photoconductor drum 31, and a rear covering 1b that supports the transfer roller 61 so that the transfer roller 61 can move into contact with and away from the photoconductor drum 31. A transfer voltage is applied to the transfer roller 61 from the power supply device 14 controlled by the image-forming-apparatus control unit 11 so that the toner image on the photoconductor drum 31 is transferred onto a sheet passing between the photoconductor drum 31 and the transfer roller 61.

Residual toner on the surface of the photoconductor drum 31 is removed by the cleaning blade 34, and is collected into a housing that supports the photoconductor drum 31. After that, the surface of the photoconductor drum 31 is charged gain by the charging roller 32. Residues, which are not removed by the cleaning blade 34, but are attached to the charging roller 32, are captured by the surface of the cleaning roller 33 rotating in contact with the charging roller 32, and are then accumulated.

The fixing device 70 includes a pair of fixing rollers 71 and 72, and a fixing area is formed by a press contact area between the fixing rollers 71 and 72.

After the toner is transferred on a sheet by the transfer roller 61, the sheet is transported to the fixing device 70 via a transport guide 62 in a state in which the toner image is unfixed. The toner image is fixed on the sheet transported to the fixing device 70 with pressure and heat by the fixing rollers 71 and 72. The sheet on which the toner image is formed is guided by transport guides 73a and 73b, and is output from a pair of output rollers 74 onto the output tray 1c provided on the upper surface of the image forming apparatus 1.

2. Configuration of Operation Unit

Figure 3:
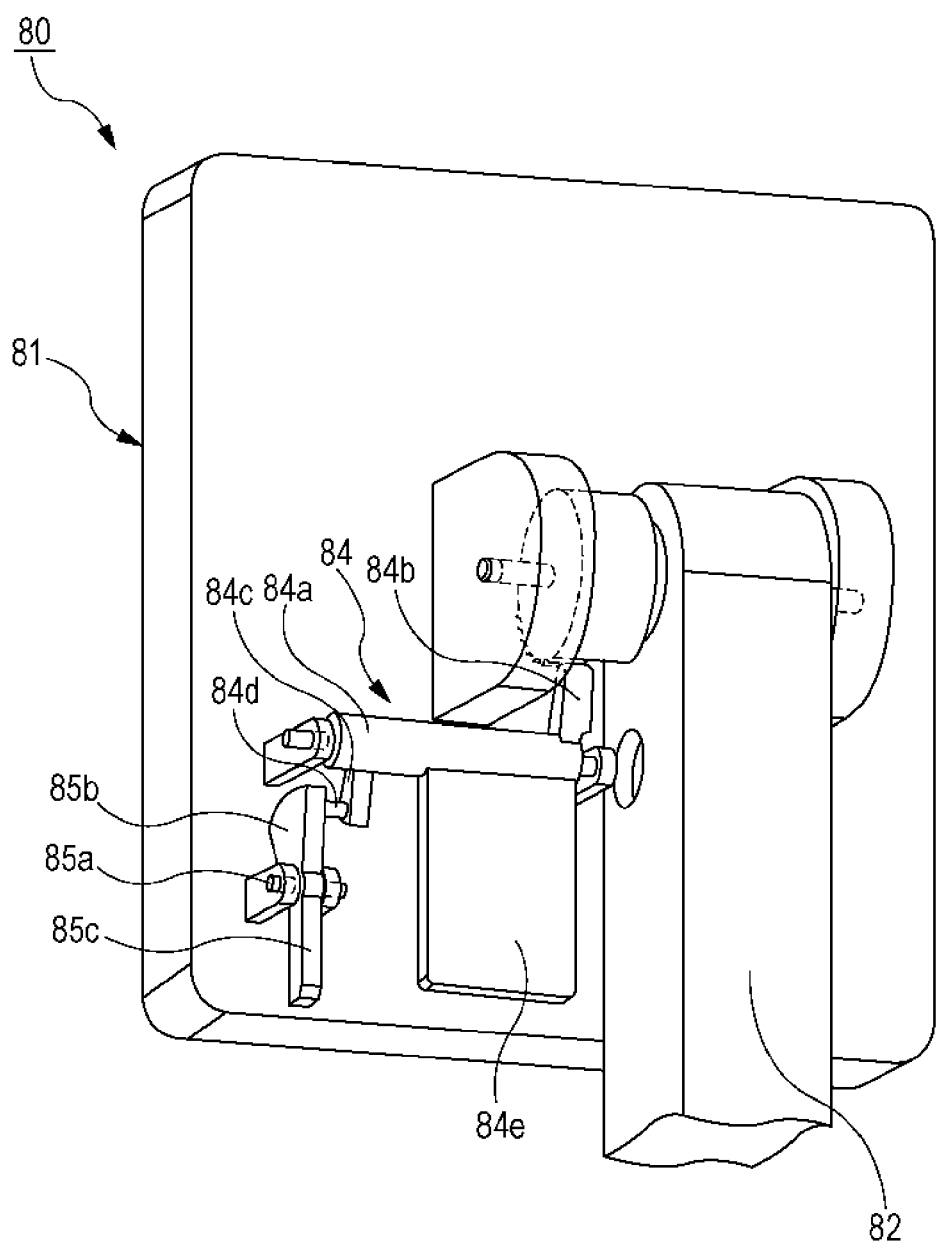
FIG. 3 is a rear (back) perspective view of an operation unit.
Figure 4:
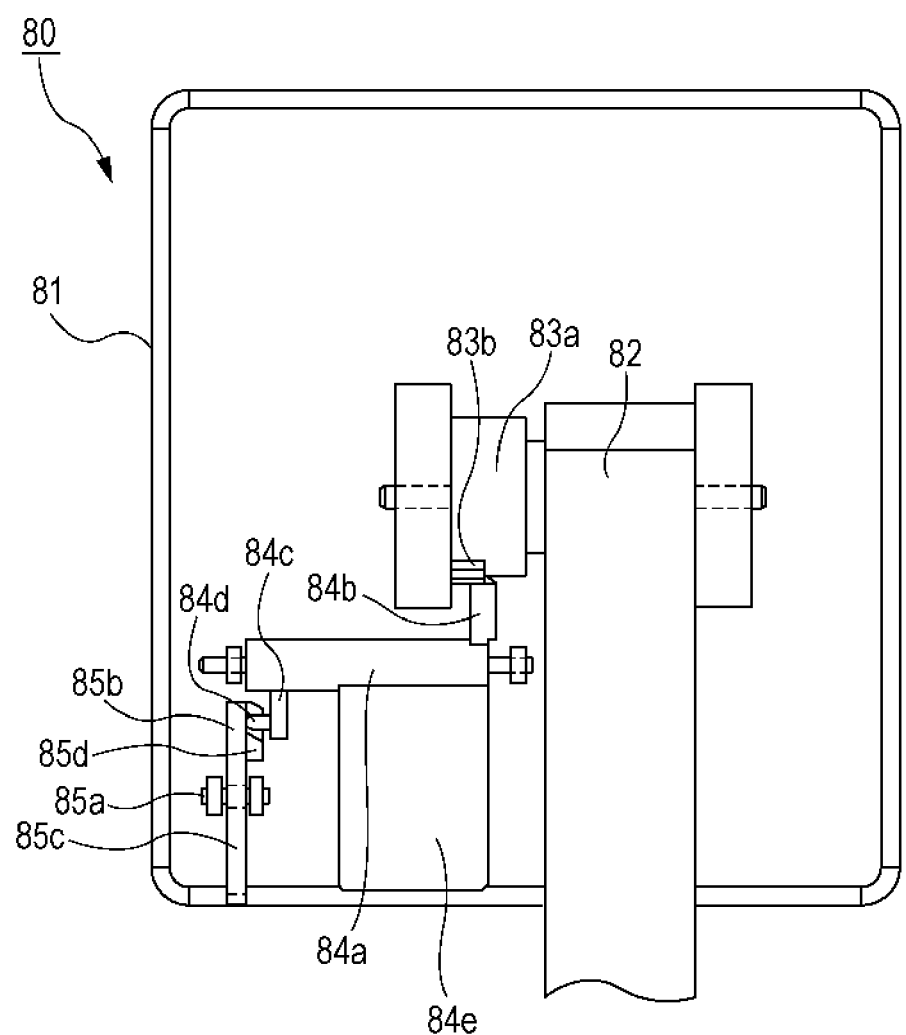
FIG. 4 is a rear (back) plan view of the operation unit.
Figure 5A:
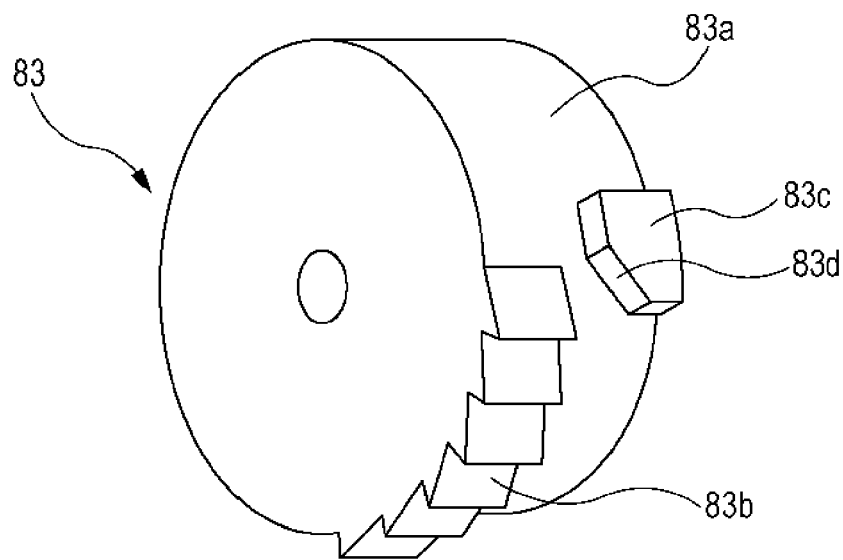
FIG. 5A is a perspective view of a ratchet member that constitutes the operation unit.
Figure 5B:
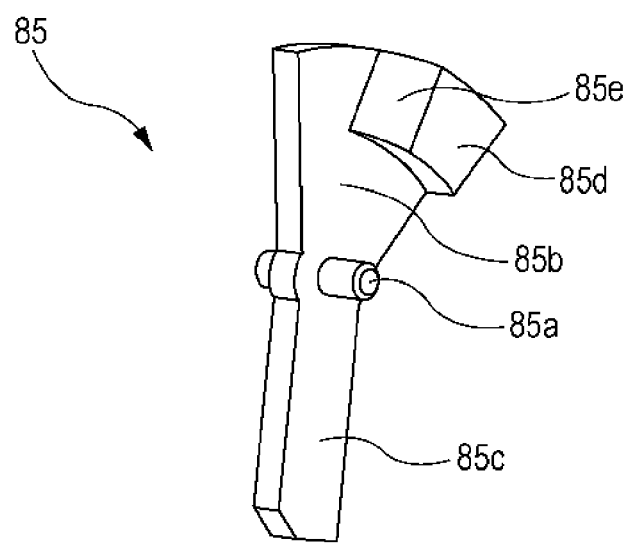
FIG. 5B is a perspective view of a release lever that constitutes the operation unit.

FIG. 3 is a rear (back) perspective view of the operation unit 80, FIG. 4 is a rear (back) plan view of the operation unit 80, FIG. 5A is a perspective view of a ratchet member 83 that constitutes the operation unit 80, and FIG. 5B is a perspective view of a release lever 86 that constitutes the operation unit 80.

The structure of the operation unit 80 will be described below with reference to the drawings.

The operation unit 80 is used to input various settings and instructions and to display information. The operation unit 80 includes a user interface 81 in which a liquid crystal display panel P and various control buttons B are combined, a support column 82 that turnably supports the user interface 81, a flip-up spring (not illustrated) serving as a biasing member that turns upward and flips up the user interface 81 from the support column 82, a ratchet mechanism that turnably holds the user interface 81, a release mechanism that releases engagement of the ratchet mechanism, and a holding mechanism that holds engagement of the ratchet mechanism.

2.1 Ratchet Mechanism

The ratchet mechanism includes a ratchet member 83 serving as a fixed-side holding portion fixed to the support column 82, a movable-side movable arm 84 opposed to the ratchet member 83 to turn together with the user interface 81, and a known biasing member (not illustrated) that biases the movable arm 84 in a direction to press the movable arm 84.

As illustrated in FIG. 5A, a fixed-side first ratchet tooth 83b shaped like a sawtooth is provided continuously and integrally with one end of a peripheral surface of a cylindrical body 83a of the ratchet member 83, and a cam portion 83c is provided integrally with the other end of the peripheral surface of the cylindrical body 83a.

Correspondingly, as illustrated in FIGS. 3 and 4, the movable arm 84 is formed by an integral body including an entirely columnar turn shaft 84a, a second ratchet tooth 84b serving as a pawl standing from at one end of a peripheral surface of the turn shaft 84a in a direction intersecting the turn shaft 84a, and a fan-shaped wall portion 84c standing from the other end of the peripheral surface of the turn shaft 84a in a direction intersecting the turn shaft 84a. Further, a projection pin 84d having a round tip projects from the fan-shaped wall portion 84c in a turn axis direction.

At the center of the turn shaft 84a of the movable arm 84, a handle 84e shaped like a flat plate stands integrally from the peripheral surface of the turn shaft 84a in a direction intersecting the turn shaft 84a.

A torsion spring serving as an example of a biasing member is inserted between the user interface 81 and the handle 84e centered on the turn shaft 84a of the movable arm 84 to press the second ratchet tooth 84b against the first ratchet tooth 83b. This permits an upward turn of the user interface 81 and restricts a downward turn of the user interface 81.

2.2 Release Mechanism

The release mechanism includes the movable arm 84 and a release lever 85 that is turned by contact with the front covering 1a.

As illustrated in FIG. 5B, the release lever 85 has a turn shaft 85a at its center. A fan-shaped wall portion 85b is provided integrally with one end of the release lever 85, and a lever portion 85c that is turned by contact with the front covering 1a is provided integrally with the other end of the release lever 85.

A cam portion 85d projects integrally from one surface of the fan-shaped wall portion 85b, and the cam portion 85d has a tapered portion 85e.

The projection pin 84d of the movable arm 84 and the fan-shaped wall portion 85b of the release lever 85 thus structured are held in turnable contact with each other by the action of a below-described toggle mechanism.

The release lever 85 is constantly biased by a known spring member (not illustrated) in a direction opposite to a direction in which it is moved when the front covering 1*a* is opened.

2.3 Holding Mechanism

The holding mechanism includes the ratchet member 83 and the movable arm 84, and holds the user interface 81 at a second holding position outside a moving area of the front covering 1*a*.

As illustrated in FIG. 5A, the cam portion 83*c* is provided integrally with the peripheral surface of the cylindrical body 83*a* of the ratchet member 83, and the cam portion 83*c* has a tapered portion 83*d*.

In the holding mechanism having the above-described structure, when the user interface 81 moves to the second holding position, a side surface of the second ratchet tooth 84*b* of the movable arm 84 comes into contact with the tapered portion 83*d* of the cam portion 83*c*, and moves the second ratchet tooth 84*b* closer to approach the first ratchet tooth 83*b*, and the first ratchet tooth 83*b* and the second ratchet tooth 84*b* are held in an engaged state.

2.4 Toggle Mechanism

Figure 6:
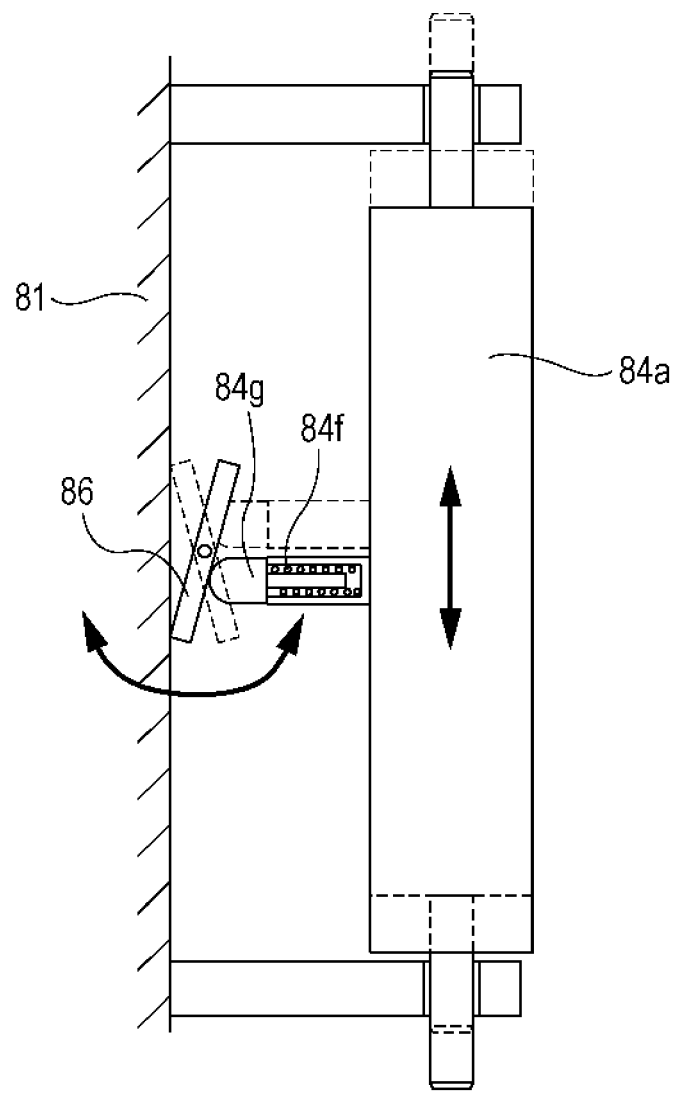
FIG. 6 is an enlarged principal view illustrating operation of a toggle mechanism.

FIG. 6 is an enlarged principal view illustrating the operation of the toggle mechanism.

The toggle mechanism includes a pushpin 84*g* projecting from an middle point of the peripheral surface of the turn shaft 84*a* of the movable arm 84 to be moved forward and backward by a push spring 84*f*, and a movable piece 86 held on the user interface 81 to swing on its center point while being in contact with the pushpin 84*g*. The toggle mechanism switches between states in which biasing force acts and does not act in the turn axis direction of the movable arm 84.

The movable arm 84 is held in a state in which biasing force acts so that the first ratchet tooth 83*b* and the second ratchet tooth 84*b* are held in an engaged state with each other.

3. Operation of Operation Unit

Figure 7A:
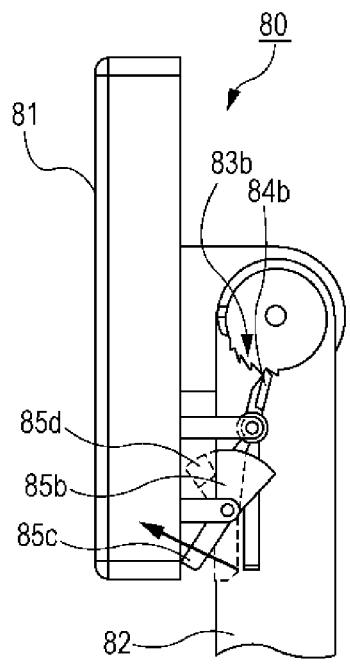
FIGS. 7A to 7C schematically illustrate a movement of the operation unit made by opening a front covering.
Figure 7B:
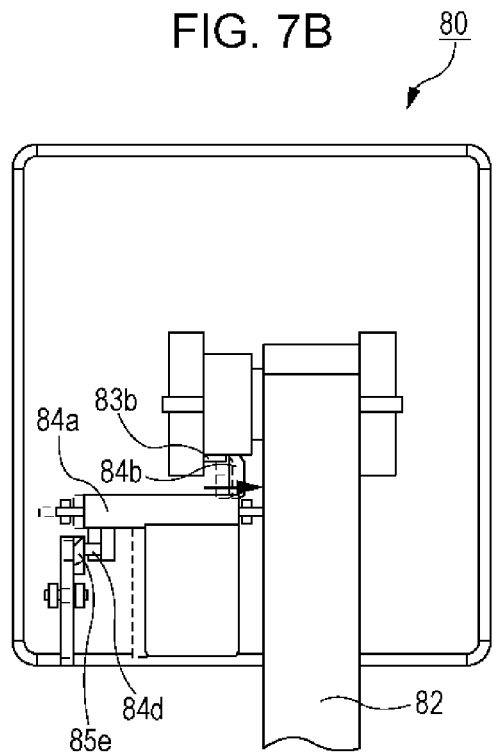
Figure 7C:
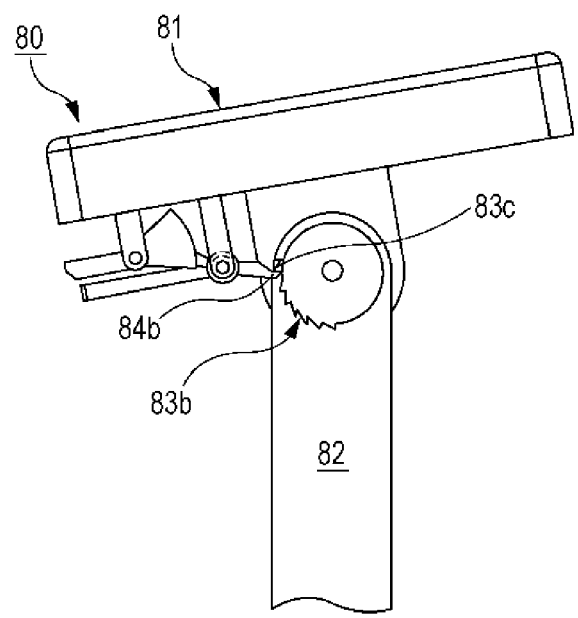
Figure 8:
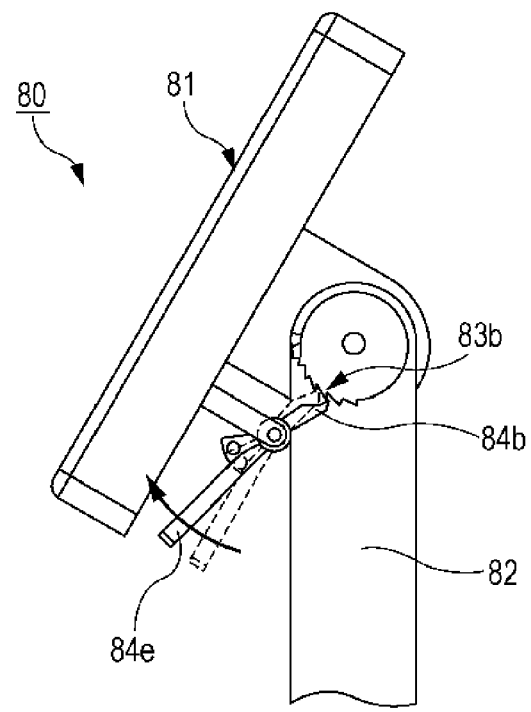
FIG. 8 schematically illustrates a movement of the operation unit made by manually operating a movable arm.
Figure 9:
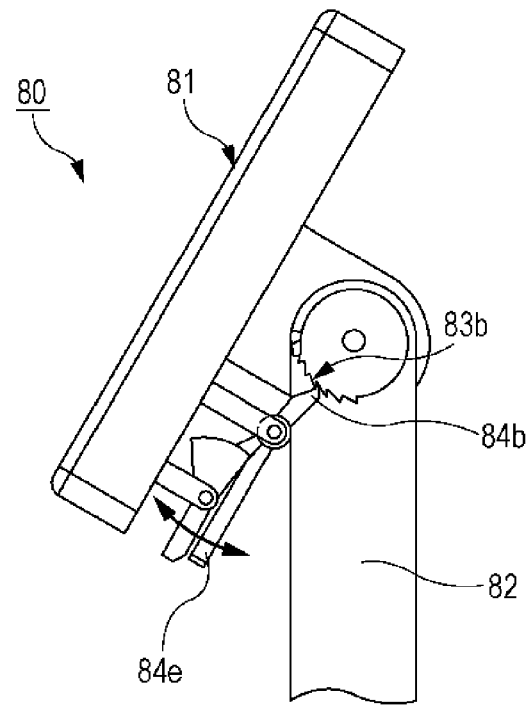
FIG. 9 schematically illustrates a tilt movement of the operation unit made by manually operating the movable arm.

FIGS. 7A to 7C schematically illustrate a movement of the operation unit 80 made by opening the front covering 1*a*, FIG. 8 schematically illustrates a movement of the operation unit 80 made by manually operating the movable arm 84, and FIG. 9 schematically illustrates a tilt movement of the operation unit 80 made by manually operating the movable arm 84. The movement of the operation unit 80 will be described below with reference to the drawings.

3.1. Movement of Operation Unit Made by Opening Front Covering

When the front covering 1*a* is turned open to open the front side (X-direction) of the image forming apparatus 1, a projection (not illustrated) provided at one end of the front covering 1*a* comes into contact with the lever portion 85*c* of the release lever 85, and the lever portion 85*c* turns (see the arrow in FIG. 7A).

As the lever portion 85*c* turns, the tapered portion 85*e* of the cam portion 85*d* of the cam portion 85*d* projecting from one surface of the fan-shaped wall portion 85*b* comes into contact with the projection pin 84*d* projecting from the fan-shaped wall portion 84*c* of the movable arm 84.

As the lever portion 85*c* further turns, the movable arm 84 moves in the turn axis direction until the projection pin 84*d* of the movable arm 84 comes into contact with an upper surface of the cam portion 85*d*, so that the first ratchet tooth 83*b* and the second ratchet tooth 84*b* are disengaged from each other (see the arrow in FIG. 7B).

When the first ratchet tooth 83*b* and the second ratchet tooth 84*b* are disengaged, the user interface 81 turnably supported by the support column 82 is turned by biasing force of the flip-up spring, and moves from a standing position relative to the image forming apparatus 1 (a first holding position) to the outside of the moving area of the front covering 1*a* and is brought into a substantially horizontal state (a second holding position).

At the same time as the user interface 81 is brought into the substantially horizontal state at the second holding position, the side surface of the second ratchet tooth 84*b* of the movable arm 84 comes into contact with the tapered portion 83*d* of the cam portion 83*c* provided on the ratchet member 83, the second ratchet tooth 84*b* moves closer to the first ratchet tooth 83*b*, and the first ratchet tooth 83*b* and the second ratchet tooth 84*b* are engaged and held at the second holding position (see the arrows in FIG. 7C).

At the second holding position, the toggle mechanism restricts the movement of the movable arm 84 in the turn axis direction so that the first ratchet tooth 83*b* and the second ratchet tooth 84*b* are held in the engaged state.

3.2 Movement of Operation Unit Made by Manually Operating Movable Arm

When the user pulls the handle 84*e* shaped like a flat plate, which is provided integrally with the center of the turn shaft 84*a* of the movable arm 84, toward the user interface 81, the first ratchet tooth 83*b* and the second ratchet tooth 84*b* are disengaged from each other (see FIG. 8).

When the first ratchet tooth 83*b* and the second ratchet tooth 84*b* are disengaged, the user interface 81 is turned by the biasing force of the flip-up spring and is brought from the standing state (first holding position) relative to the image forming apparatus 1 into a substantially horizontal state (second holding position) outside the moving area of the front covering 1*a*.

Subsequent operations of the holding mechanism are similar to those performed when the operation unit 80 is moved by opening the front covering 1*a*.

The holding mechanism can also be used as a tilt mechanism. In this case, the first ratchet tooth 83*b* and the second ratchet tooth 84*b* are disengaged from each other by pulling the handle 84*e* of the movable arm 84 toward the user interface 81 from the state in which the user interface 81 is held at the second holding position, and the first ratchet tooth 83*b* and the second ratchet tooth 84*b* are held at an engaged state again at a predetermined turn position (see FIG. 9).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a support column having one end fixed to an apparatus body and another end that turnably supports an operation unit;
   an opening and closing member configured to move between a closed position to hide an inside of the apparatus body and an open position to expose the inside; and
   a lock unit configured to hold the operation unit at a first holding position within a moving area of the opening and closing member and at a second holding position outside the moving area of the opening and closing member, wherein the lock unit is configured to release the operation unit in cooperation with an opening operation of the opening and closing member in a state in which the operation unit is held at the first holding position, and to move the operation unit to the second holding position while keeping the operation unit released, and wherein the lock unit comprises a ratchet mechanism.

2. The image forming apparatus according to claim 1 wherein the another end turnably supports the operation unit about a turn axis extending through the support column.

3. The image forming apparatus according to claim 1, wherein the ratchet mechanism comprises:
   a fixed-side holding portion provided around the turn axis of the operation unit, the fixed-side portion having a ratchet tooth;
   a movable arm provided opposed to the holding portion,
      wherein the movable arm is configured to move together with the operation unit, and
      wherein the movable arm comprises a movable-side pawl member configured to be engaged with the ratchet tooth to allow an upward turn of the operation unit and to restrict a downward turn of the operation unit; and
   a biasing member that biases the ratchet tooth and the pawl member to press against each other;
wherein the lock unit further comprises:
   a release mechanism configured to disengage the pawl member from the ratchet tooth; and
   a holding mechanism configured to move the disengaged pawl member closer to the ratchet tooth, and to hold the ratchet tooth and the pawl member in an engaged state to prevent the downward turn of the operation unit.

4. The image forming apparatus according to claim 3, wherein the release mechanism includes:
   a first release lever that has a turn shaft at a middle portion,
      wherein the first release lever is configured to be turned by contact with the opening and closing member; and
   a second release lever that has a turn shaft,
      wherein the second release lever is supported to be moved in a turn axis direction by contact with the first release lever,
   wherein the first release lever has a projection projecting toward the second release lever, and
   wherein the second release lever has a projection pin projecting in the turn axis direction.

5. The image forming apparatus according to claim 4, wherein the ratchet mechanism includes a cylindrical body having the ratchet tooth, and the second release lever,
   wherein the image forming apparatus is configured such that, when the operation unit moves to the second holding position, a side surface of the pawl member comes into contact with a projecting cam portion provided on a peripheral surface of the cylindrical body, the pawl member is moved closer to the ratchet tooth, and the ratchet tooth and the pawl member are held in an engaged state.

6. The image forming apparatus according to claim 4, wherein the lock unit further includes a biasing mechanism that biases the second release lever in the turn axis direction, and
   wherein the biasing mechanism is configured to switch between states in which a biasing force acts and does not act in the turn axis direction of the second release lever.

7. The image forming apparatus according to claim 6, wherein the biasing mechanism is a toggle mechanism, and
   wherein the biasing mechanism holds the second release lever in a state in which the biasing force acts to hold the ratchet tooth and the pawl member in an engaged state.

8. The image forming apparatus according to claim 1 wherein the one end of the support column is fixed to the apparatus body such that the support column is vertically non-movable.

9. The image forming apparatus according to claim 1, wherein the ratchet mechanism comprises a fixed-side holding portion provided around a turn axis of the operation unit, the fixed-side portion having a ratchet tooth.

10. The image forming apparatus according to claim 9, wherein the ratchet mechanism further comprises a moveable arm opposed to the holding portion, and
   wherein the moveable arm is configured to be engaged with the ratchet tooth.

* * * * *